US 6,664,821 B2

(12) United States Patent
De Haas et al.

(10) Patent No.: US 6,664,821 B2
(45) Date of Patent: Dec. 16, 2003

(54) LINE DRIVER WITH CURRENT SOURCE OUTPUT AND LOW SENSITIVITY TO LOAD VARIATIONS

(75) Inventors: Clemens Gerhardus Johannes De Haas, Nijmegen (NL); Hendrik Boezen, Nijmegen (NL); Aloysius Johannes Maria Boomkamp, Nijmegen (NL); Gerrit Jan Bollen, Nijmegen (NL); Abraham Klaas Van Den Heuvel, Nijmegen (NL); Ruurd Anne Visser, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 50 days.

(21) Appl. No.: 10/095,400

(22) Filed: Mar. 11, 2002

(65) Prior Publication Data

US 2002/0149404 A1 Oct. 17, 2002

(30) Foreign Application Priority Data

Mar. 12, 2001 (EP) ............................. 01200909

(51) Int. Cl.[7] ................................. H03K 3/00
(52) U.S. Cl. ............................. 327/108; 326/30; 326/86
(58) Field of Search .................... 327/108; 326/30, 326/82, 83, 84, 85, 86, 87, 88, 90

(56) References Cited

U.S. PATENT DOCUMENTS 3,863,140 A  *  1/1975  Easter et al. .................. 323/17
6,052,790 A  *  4/2000  Brown ........................ 713/300
6,404,679 B1 *  6/2002  Guedj ...................... 365/185.21
6,583,610 B2 *  6/2003  Groom et al. ............... 323/288

* cited by examiner

Primary Examiner—Tuan T. Lam
Assistant Examiner—Hiep Nguyen
(74) Attorney, Agent, or Firm—Steven R. Biren

(57) ABSTRACT

Line driver for a LIN-bus. The line driver has a current source output transistor (T1) for pulling down the LIN-bus wire (LB) to ground (GND). The LIN-bus wire (LB) is connected to a positive supply voltage (VBAT) through a pull-up resistor (R1). The output transistor (T1) provides a ramp shaped output current under control of a ramp generator (RG). The ramp shaped output current in combination with the pull-up resistor (R1) asserts a ramp shaped output voltage on the LIN-bus wire (LB). According to the LIN-bus specifications the resistance of the pull-up resistor may vary between 500 Ohm and 1 kOhm. When the resistance is 1 kOhm, the output voltage is clamped to signal ground (GND) and a delay occurs between the edge in the data signal (TXD) and the corresponding rising ramp in the output voltage. This delay is reduced considerably by a comparator (CMP, T2) which monitors the output voltage and which increases the slew rate of the ramp generator (RG) when the output voltage is clamped and drops below a certain threshold.

6 Claims, 3 Drawing Sheets

LINE DRIVER WITH CURRENT SOURCE OUTPUT AND LOW SENSITIVITY TO LOAD VARIATIONS

The invention relates to line drivers, in particular to a driver for the LIN-bus (Local Interconnect Network). The LIN-bus is used in automotive applications and is a concept of a single master and multiple slaves connected to a single bus wire. The bus wire is connected to a supply voltage which is positive with respect to ground by means of an external pull-up resistor which keeps the bus wire in a recessive voltage level corresponding to a relatively high positive voltage near to the positive supply voltage. The master and the slaves have a built-in line driver for pulling down the bus wire voltage to a dominant voltage level corresponding to a relatively low positive voltage near to ground level in response to a data signal.

The EMI (Electro Magnetic Immunity) performance of a LIN bus driver used in an automotive environment is a very important parameter. RF (Radio Frequency) disturbances on the line driver output can result in misinterpretation of the recessive and dominant voltage levels, or can result in an asymmetrical propagation delay between the rising and falling edges of the LIN-bus signals, which causes a duty cycle different from the desired 50%. Both can be a cause for faulty communication.

A current source output stage is a good choice with respect to EMI. Such a current source output stage allows the RF disturbances to be superimposed on the original LIN-bus signal. The RF disturbances can be filtered out by means of low-pass filters at the input of the receivers. However, a current source output stage causes an unwanted delay during a transition in the bus signal from ground level to positive supply voltage level. When using a current source to control the voltage on the LIN-bus line, not only the current from the current source, but also the load impedance on the bus line dictates the LIN-bus voltage. According to the LIN protocol specification the load may vary between 500 Ohm and 1 kOhm.

In case of a 1 kOhm load a delay occurs in the transition from ground level to the positive supply voltage level, because the ramp generator which drives the current source output stage is designed for the worst-case load of 500 Ohm. In case of a 1 kOhm load the current source will try to pull down the LIN-bus voltage below ground level when the drive signal from the ramp generator crosses a certain level, which is not possible. When the direction of the output current is reversed, the LIN-bus voltage remains at ground level during a certain waiting time until the ramp generator again crosses said level in reverse direction. This waiting time causes a delay between the on-set of the transition from ground level to the positive supply voltage level and the corresponding edge of the data signal.

It is an object of the invention to provide a line driver which is less sensitive to load variations. According to the invention this object is achieved by a line driver comprising:

a driver output terminal for connection to a line to be driven;

a reference terminal for connection to a reference voltage;

a ramp generator for providing a substantially linearly inclining and declining ramp signal in response to a data signal, the ramp generator having a control input for connecting a control signal, the ramp signal having a slew rate substantially proportional to the control signal;

a current source output transistor having its first main electrode coupled to the reference terminal and its second main electrode coupled to the driver output terminal for providing a current between the driver output terminal and the reference terminal which current is proportional to the ramp signal;

a comparator for comparing a voltage drop across the current source output transistor to a threshold voltage; and the comparator having an output coupled to the control input of the ramp generator and being operable to increase the slew rate of the ramp signal when the voltage drop is smaller than the threshold voltage.

The comparator considerably increases the slew rate as soon as the voltage across the current source output transistor drops below the threshold voltage, as a result of which the output signal of the ramp generator and thus also the output current of the line driver quickly reaches its end value. In the reverse direction, when the voltage across the current source output transistor is still below the threshold voltage, the output current of the line driver quickly decreases with high slew rate until the voltage across the current source output transistor exceeds the threshold voltage thereby considerably reducing the waiting time.

In the embodiment as claimed in claim 2 the control signal is a current source and the comparator is a simple transistor. The current from the transistor is added to the current from the current source to increase the slew rate of the ramp signal.

In the embodiment as claimed in claim 3, the current from the transistor is conveniently added to the current from the current source by means of a current mirror.

The embodiment as claimed in claim 4 provides a driver stage for driving the current source output transistor from a controllable current source. The reference transistor and the current source output transistor are scaled copies of each other. Therefore, the current flowing through the current source output transistor is proportional to the current flowing through the reference transistor. The resistor provides a low-impedance path to ground for RF disturbances reaching the control electrode of the current source output transistor through the capacitance between the second main electrode and the control electrode of the current source output transistor and prevents these disturbances from reaching the driver stage.

These and other aspects of the invention will now be described and elucidated with reference to the accompanying drawings, in which FIG. 1 shows a schematic diagram of a LIN bus and signals occurring in the LIN bus;

In these Figures like parts bear the same reference symbols.

Figure 1:
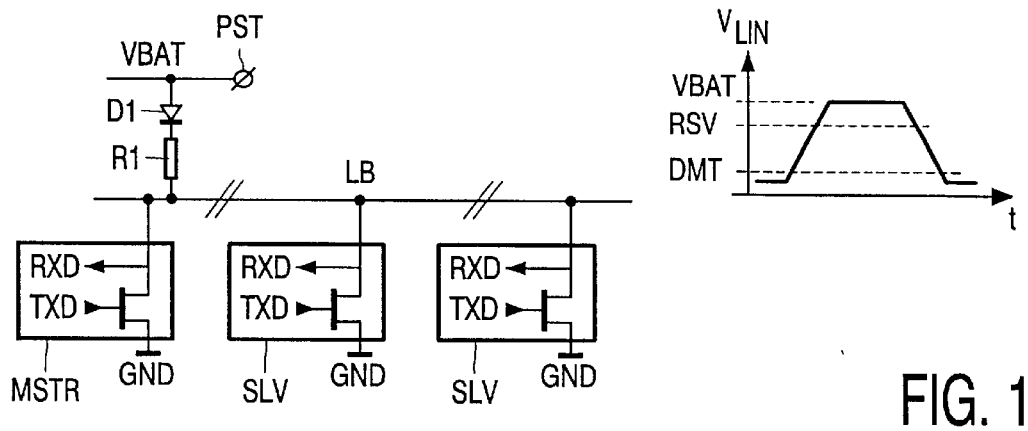

The line driver according to the invention is particularly useful in the LIN-bus (Local Interconnect Network) which is used, for example, in automotive applications. FIG. 1 shows a schematic diagram of a LIN-bus and signals occurring in the LIN-bus. The LIN-bus is a concept of a single master node MSTR and multiple slave nodes SLV connected to a single LIN-bus wire LB. The LIN-bus wire LB is connected to a positive supply terminal PST by means of a pull-up resistor R1 in series with a decoupling diode D1. The decoupling diode D1 prevents current flowing from the LIN-bus wire LB to the positive supply terminal PST. The positive supply terminal PST receives a positive supply voltage VBAT with respect to a reference terminal GND which serves as signal ground. The pull-up resistor R1 keeps the bus wire at a recessive voltage level RSV corresponding to a relatively high voltage near to the positive supply voltage VBAT. The master and slave nodes have a built-in line driver for pulling down, during transmission a data signal TXD, the LIN-bus wire voltage to a dominant voltage level DMT which corresponds to a relatively low voltage near to ground level in response to the data signal TXD. Each node also has a built-in receiver (not shown) which processes the signal RXD received from a transmitting node.

The EMI (Electro Magnetic Immunity) performance of a LIN transceiver used in an automotive environment is a very important parameter. RF (Radio Frequency) disturbances on the line driver output can result in misinterpretation of the recessive and dominant voltage levels, or can result in an asymmetrical propagation delay between the rising and falling edges of the LIN-bus signals which causes a duty cycle different from the desired 50% to occur. Both can be a cause for faulty communication. A line driver with a current source output stage is a good choice with respect to EMI. Such a current source output stage allows the RF disturbances to be superimposed on the original LIN-bus signal. The RF disturbances can be filtered out by means of low-pass filters at the inputs of the receivers.

Figure 2:
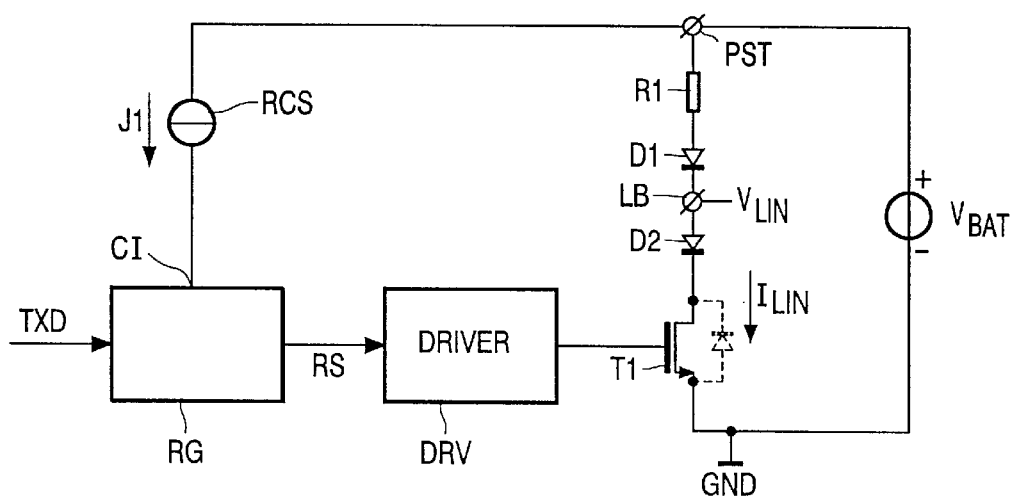
FIG. 2 shows a circuit diagram for explanation of the operation of a line driver according to the invention.

FIG. 2 shows a line driver with a current source output stage. The pull-up resistor R1 and decoupling diode D1 connect the LIN-bus wire LB to the positive supply voltage terminal PST. A current source transistor T1 in series with a diode D2 are connected between the reference terminal GND and the LIN-bus wire LB. The first main electrode or source of the current source transistor T1 is connected to the reference terminal GND and the second main electrode or drain is connected to the LIN-bus wire LB through the diode D2. Diodes D1 and D2 prevent current flowing from the LIN-bus wire LB to the positive supply terminal PST or to the reference terminal GND. Diode D2 is necessary because of the parasitic diode present in the current source transistor T1. The line driver further comprises a ramp generator RG which provides a linear inclining/declining ramp signal RS in response to the data signal TXD. The slew rate of the ramp generator RG is controlled by a current J1 from a ramp control current source RCS connected to a control input CI of the ramp generator RG. The current J1 has a value proportional to the positive supply voltage VBAT, so that the total time of a voltage transition on the LIN-bus wire LB from the positive supply voltage VBAT to ground level and back is constant with different supply voltages. The ramp signal RS is converted into a suitable drive voltage by a driver stage DRV which drives the control electrode or gate of the current source transistor T1 in such a manner that the output current $I_{LIN}$ provided by transistor T1 is proportional to the ramp signal RS. The output current $I_{LIN}$ pulls down the LIN-bus wire LB with a well-defined linear transition for good EME (Electro Magnetic Emission) performance.

Figure 3:
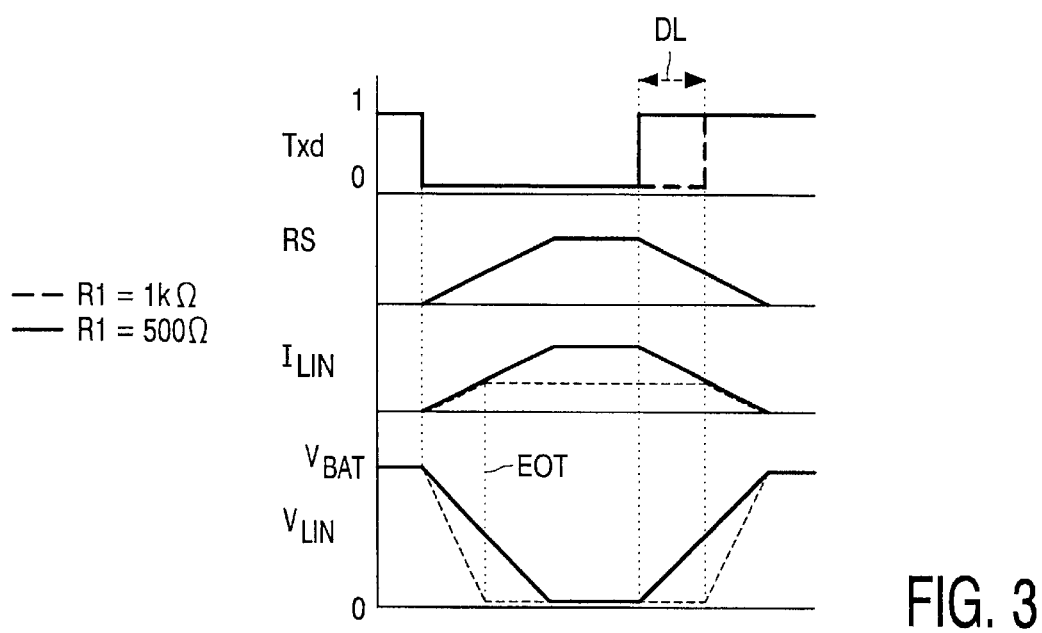
FIG. 3 shows waveforms of signals occurring in the circuit diagram of FIG. 2.

When using a current to control the voltage $V_{LIN}$ on the LIN-bus, the load impedance R1 on the bus also dictates the voltage $V_{LIN}$. According to the LIN protocol specification the load impedance R1 may vary between 500 Ohm and 1 kOhm. In case of 1 kOhm, a delay occurs in the transition from ground level to the positive supply voltage level VBAT, because the ramp generator RG is designed for the worst case load of 500 Ohm. For a 1 kOhm load the output current $I_{LIN}$ is clamped as shown in FIG. 3 in dashed lines. During the transition from the positive supply voltage VBAT to ground level the ramp signal RS tries to pull down the LIN-bus voltage $V_{LIN}$ below ground level at the end of the transition EOT, which is not possible. The result is a delay DL between the trailing edge of the data signal TXD and the onset of the transition of the voltage on the LIN-bus from ground level to positive supply voltage level.

Figure 4:
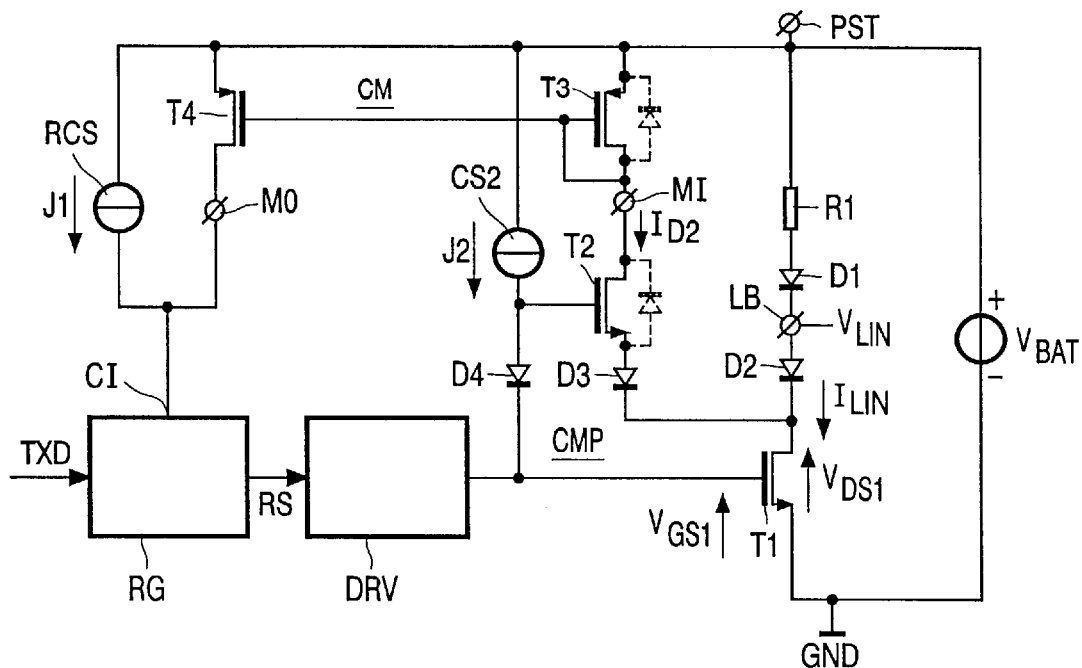
FIG. 4 shows a circuit diagram of an embodiment of a line driver according to the invention.

FIG. 4 shows a circuit diagram of an embodiment of a line driver according to the invention, which is provided with a detector which monitors the end of transition EOT and which provide feedback to prevent the delay DL. The end of the transition is measured by a comparator CMP, which compares the drain-source voltage $V_{DS1}$ across the current source output transistor T1 to a threshold voltage. If the drain-source voltage is too low, the output current is clamped. The current source output transistor T1 works as a current source when it is working in its saturation or pinch-off region when $V_{DS}>V_{GS}-V_T$. Here, $V_{DS}$ is the drain-source voltage, $V_{GS}$ is the gate-source voltage and $V_T$ is the threshold voltage of a MOS transistor. When $V_{DS} \leq V_{GS}-V_T$, i.e. in the triode or ohmic region, the current source behavior of transistor T1 gradually changes to a resistive behavior. The comparator CMP has to measure if the drain-source voltage $V_{DS}$ of transistor T1 is below $V_{GS}-V_T$.

The comparator CMP is made from a current source CS2, a second transistor T2, a diode D4 and a diode D3. The current source CS2 is connected between the positive supply terminal PST and the gate of the second transistor T2. The diode D4 is connected between the gate of transistor T2 and the gate of the current source output transistor T1. The current J2 of current source CS2 flows through the diode D4 into the driver stage DRV. The drain of transistor T2 which serves as the output of the comparator CMP, is coupled to an input terminal MI of a current mirror CM consisting of the transistors T3 and T4. The current mirror CM has an output terminal MO coupled to the control input CI for adding a current to the current J1 of ramp control current source RCS. Diode D3 prevents current flowing from the LIN-bus wire LB through diode D2, the back gate diodes of transistors T2 and T3 to the positive supply terminal PST. The voltage drop $V_{D4}$ of diode D4, biased by constant current J2, roughly compensates the voltage drop $V_{D3}$ of diode D3.

Assuming that transistor T2 is matched with transistor T1, then the following equation holds:

$$V_{GS2}=V_{GS1}+V_{D4}-V_{D3}-V_{DS1} \approx V_{GS1}-V_{DS1}$$

Figure 5:
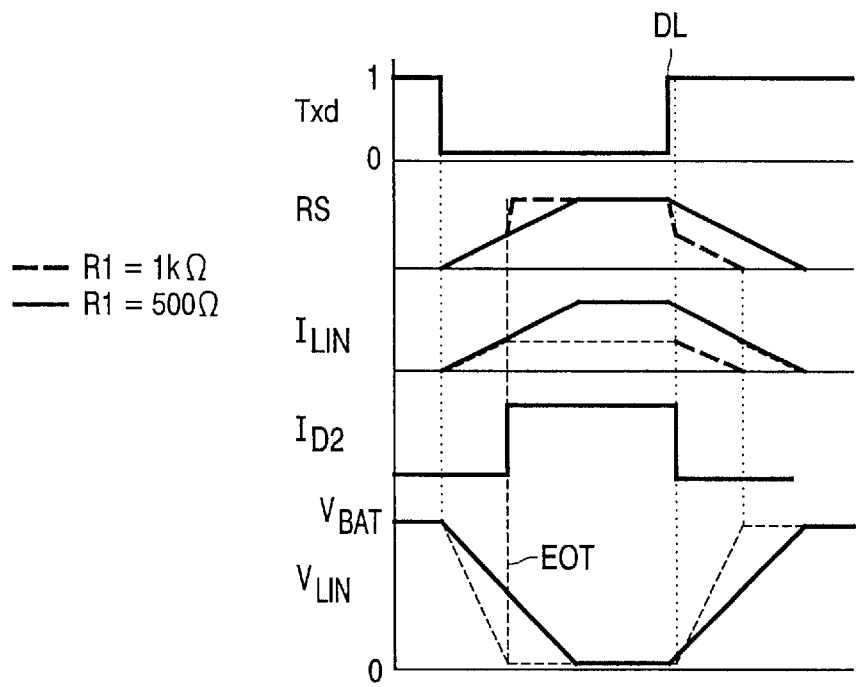
FIG. 5 shows waveforms of signals occurring in the circuit diagram of FIG. 4.

Transistor T2 becomes conductive when $V_{GS2}>V_T$. So, the drain current $I_{D2}$ of transistor T2 is increasing when $V_{DS1}<V_{GS1}-V_T$. Transistor T2 operates as a comparator which compares the voltage drop $V_{DS1}$ across the current source output transistor T1 to a threshold voltage $V_{GS1}-V_T$. The drain current $I_{D2}$ of transistor T2 is mirrored by the transistors T3 and T4, and added to the current J1. In this way, when the voltage drop $V_{DS1}$ across the current source output transistor T1 is below the threshold, the slew rate of the ramp generator RG is increased substantially ($I_{D2}>>J1$), and the ramp signal RS reaches its end value in a very short time at the end of transition EOT, as shown in FIG. 5. The exact value of the increased slew rate (dictated by the value of $I_{D2}$) is not critical; it has to be high enough to decrease the delay.

Referring to FIG. 5 the operation of the line driver of FIG. 4 is explained. When the data signal TXD is 1, the output signal RS of the ramp generator RG is zero, the output current $I_{LIN}$ is zero and the LIN-bus voltage $V_{LIN}$ is equal to VBAT. The gate-source voltage $V_{GS2}$ of transistor T2 is negative, so the drain current $I_{D2}$ is zero. When the data signal TXD changes from 1 to 0, the output signal RS ramps up with a slew rate dictated by current J1. In case of a load impedance R1 equal to 1 kOhm, the voltage $V_{LIN}$ reaches the end of transition EOT before the ramp signal RS has reached its end level. The output current $I_{LIN}$ is clamped at a current level equal to $(VBAT-V_{DS1}-V_{D2})/1000$. When $V_{DS1}<V_{GS1}-V_T$, the current through the transistors T2, T3 and T4 increases and the slew rate of the ramp signal RS changes to a much higher value as indicated in the dashed line. The ramp signal RS reaches its end value very fast.

When the data signal TXD changes back from 1 to 0, the comparator CMP is still active, i.e. transistor T2 is still conductive. The ramp signal RS therefore ramps down very fast and the voltage $V_{DSI}$ increases quickly. The delay DL present at the transition from ground level to the positive supply voltage level VBAT now is small and insignificant. When $V_{DS1}>V_{GS1}-V_T$, the drain current $I_{D2}$ of transistor T2 becomes zero and the slew rate of the ramp signal RS returns to its normal value dictated by the current J1.

Figure 6:
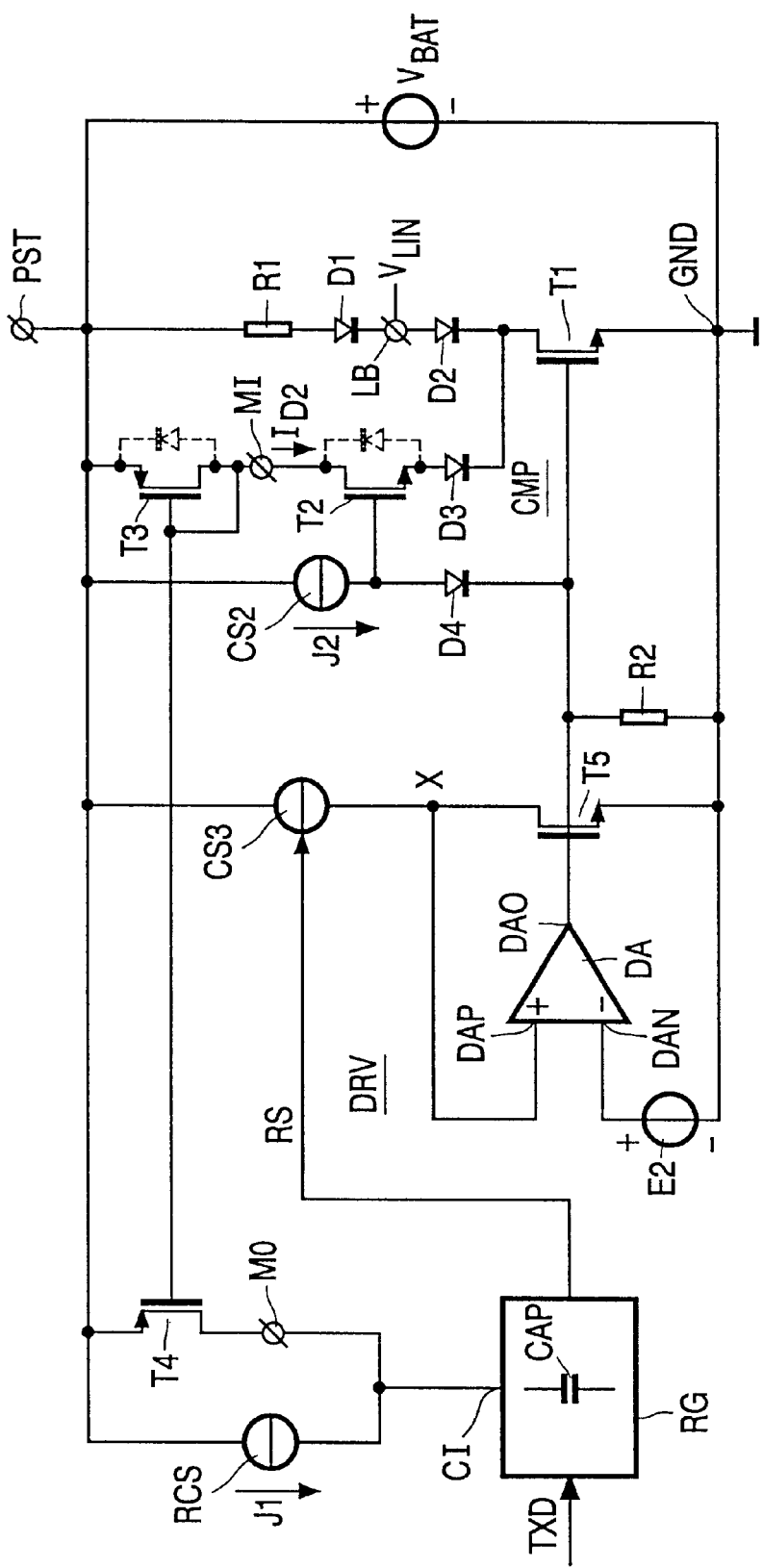
FIG. 6 shows a circuit diagram of a further embodiment of a line driver according to the invention.

FIG. 6 shows a further embodiment based on the circuit of FIG. 4 in which the driver stage DRV is implemented with a resistor R2, a reference transistor T5 which is a scaled copy of the current source output transistor T1, a differential amplifier DA, a bias voltage source E2 and a current input node X for receiving an inclining and declining ramp current from a controllable current source CS3. The resistor R2 is connected between the gate of the current source output transistor T1 and the reference terminal GND. The differential amplifier DA has an inverting input DAN coupled to the bias voltage source E2. The current input node X is coupled to a non-inverting input DAP of the differential amplifier DA. The reference transistor T5 has its source connected to the reference terminal GND and its drain coupled to the current input node X. The gate of the current source output transistor T1 and the gate of the reference transistor T5 are both connected to an output DAO of the differential amplifier DA. Due to the scaling, the drain current of the current source output transistor T1 is proportional to the drain current of the reference transistor T5, which in turn is equal to the ramp current supplied by the controllable current source CS3. The differential amplifier DA keeps the voltage at the current input node X at a level dictated by the bias voltage source E2 and provides a drive signal to the gates of the transistors T1 and T5 in such a manner that the output current provided by transistor T1 is proportional to the ramp current from the controllable current source CS3. The resistor R2 provides a low-impedance path to signal ground for RF signals on the LIN-bus wire LB which unwanted penetrate through diode D2 and the drain-gate capacitance of the current source output transistor T1.

The ramp generator RG may be implemented with a capacitor CAP which is charged and discharged with a current proportional to the current supplied at the control input CI of the ramp generator RG under control of the data signal TXD to be transmitted on the LIN-bus. The ramp shaped voltage of the capacitor is used as the ramp signal RS for controlling the controllable current source CS3.

In the embodiments unipolar or MOS transistors have been shown by way of example. Bipolar transistors can be used as well. In that case the control electrode, the first main electrode and the second main electrode correspond to, respectively, the base, emitter and collector of the bipolar transistor.

The invention provides a line driver, in particular a line driver for a LIN-bus. The line driver has a current source output transistor T1 for pulling down the LIN-bus wire LB to ground GND. The LIN-bus wire LB is connected to a positive supply voltage VBAT through a pull-up resistor R1. The output transistor T1 provides a ramp shaped output current under control of a ramp generator RG. The ramp shaped output current in combination with the pull-up resistor R1 asserts a ramp shaped output voltage $V_{LIN}$ on the LIN-bus wire LB. According to the LIN-bus specifications, the resistance of the pull-up resistor may vary between 500 Ohm and 1 kOhm. When the resistance is 1 kOhm, the output voltage $V_{LIN}$ is clamped to signal ground GND and a delay occurs between the edge in the data signal TXD and the corresponding rising ramp in the output voltage. This delay is reduced considerably by a comparator CMP which monitors the output voltage and which increases the slew rate of the ramp generator RG when the output voltage $V_{LIN}$ is clamped and drops below a certain threshold.

What is claimed is:

1. A line driver comprising:
   a driver output terminal (LB) for connection to a line to be driven;
   a reference terminal (GND) for connection to a reference voltage;
   a ramp generator (RG) for providing a substantially linearly inclining and declining ramp signal (RS) in response to a data signal (TXD), the ramp generator (RG) having a control input (CI) for connecting a control signal, the ramp signal (RS) having a slew rate substantially proportional to the control signal;
   a current source output transistor (T1) having its first main electrode coupled to the reference terminal (GND) and its second main electrode coupled to the driver output terminal (LB) for providing between the driver output terminal (LB) and the reference terminal (GND) a current which is proportional to the ramp signal (RS);
   a comparator (CMP) for comparing a voltage drop across the current source output transistor (T1) to a threshold voltage; and
   the comparator (CMP) having an output (T2) coupled to the control input (CI) of the ramp generator (RG) and being operable to increase the slew rate of the ramp signal when the voltage drop is smaller than the threshold voltage.

2. A line driver as claimed in claim 1, characterized in that the control signal is a current supplied by a ramp control current source (RCS) coupled to the control input (CI) and in that the comparator (CMP) comprises a further transistor (T2) having its control electrode coupled to a control electrode of the current source output transistor (T1), having its first main electrode coupled to the second main electrode of the current source output transistor (T1) and having its second main electrode coupled to the control input (CI) of the ramp generator (RG).

3. A line driver as claimed in claim 2, characterized in that the second main electrode of the further transistor (T2) is coupled to the control input (CI) of the ramp generator (RG) through a current mirror (CM), the current mirror (CM) having an input terminal (MI) coupled to the second main electrode of the further transistor (T2), the current mirror (CM) having an output terminal (MO) coupled to the control input (CI) of the ramp generator (RG) and the current mirror (CM) having a common terminal coupled to a supply voltage terminal (PST).

4. A line driver as claimed in claim 2, further comprising a resistor (R2) connected between a control electrode of the current source output transistor (T1) and the reference terminal (GND), a differential amplifier (DA) having an inverting input (DAN), a non-inverting input (DAP) and an output (DAO), a bias voltage source (E2) coupled to the inverting input (DAN), a current input node (X) coupled to the non-inverting input (DAP), a reference transistor (T5) having a first main electrode connected to the reference terminal (GND), a second main electrode coupled to the current input node (X) and a control electrode, the control electrode of the current source output transistor (T1) and the control electrode of the reference transistor (T5) being connected to the output (DAO) of the differential amplifier (DA), and a controllable current source (CS3) coupled to the current input node (X) for supplying a substantially linearly inclining and declining ramp current to the current input node (X) in response to the data signal.

5. A line driver as claimed in claim 4, characterized in that the controllable current source (CS3) receives a control signal (RS) generated by a circuit (RG) for charging and discharging a capacitor (CAP) with charge and discharge currents proportional to a current supplied to the control input (CI).

6. A line driver as claimed in claim 2, further comprising a first diode (D2) coupling the second main electrode of the current source output transistor (T1) to the driver output terminal (LB), a second diode (D3) coupling the second main electrode of the current source output transistor (T1) to the first main electrode of the further transistor (T2) and a third diode (D4) coupling the control electrode of the current source output transistor (T1) to the control electrode of the further transistor (T2), and a bias means (CS2) coupled to the third diode (D4) for providing a bias current to the third diode (D4).

* * * * *